Patented Oct. 28, 1924.

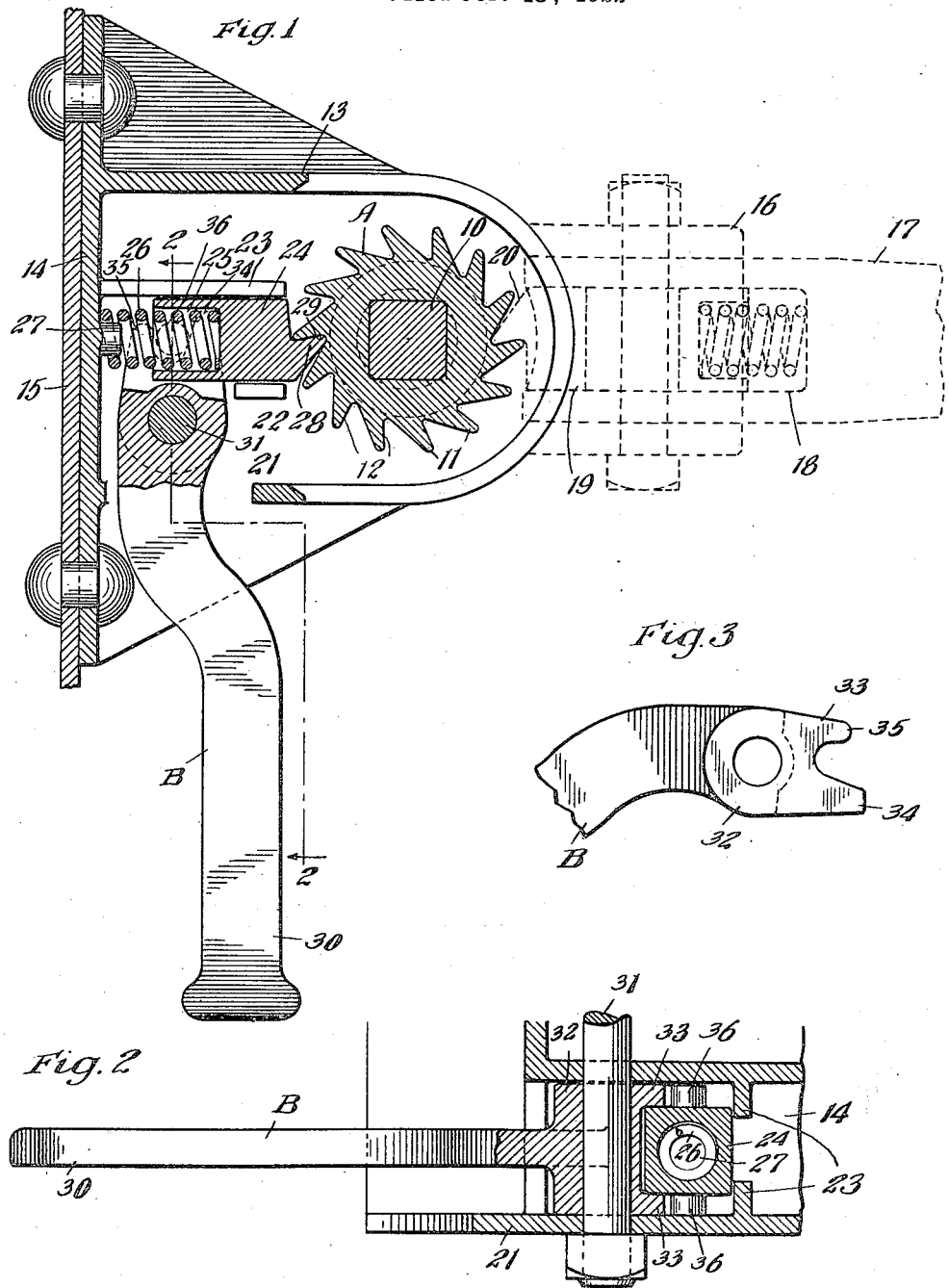

1,512,925

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

HAND BRAKE FOR RAILWAY CARS.

Application filed February 18, 1922. Serial No. 537,367.

*To all whom it may concern:*

Be it known that I, STACY B. HASELTINE, a citizen of the United States, residing at Chicago, in the county of Cook and State of Illinois, have invented a certain new and useful Improvement in Hand Brakes for Railway Cars, of which the following is a full, clear, concise, and exact description, reference being had to the accompanying drawings forming a part of this specification.

This invention relates to improvements in hand brakes for railway cars.

In the present practice of ratchet types of hand brakes for railway cars, considerable difficulty is experienced with the usual type of ratchet wheel, pawl and locking dog, on account of the pawl or dog slipping off of the ratchet wheel teeth when the tension on the brake chain becomes high. This, of course, is a source of danger to the brakeman, as well as a source of annoyance and difficulty in properly braking the cars.

One object of the invention is to provide an improved arrangement for hand brakes for railway cars which will eliminate danger of either the operating pawl or the locking dog being pressed out from operative engagement with the ratchet wheel so as to insure safety of operation.

Another object of the invention is to provide an improved arrangement of locking dog and release lever therefor.

In the drawing forming a part of this specification, Figure 1 is a horizontal, sectional view of a portion of an end wall of a car and a hand brake arrangement showing my improvements in connection therewith. Figure 2 is a vertical, sectional view corresponding to the section line 2—2 of Figure 1. And Figure 3 is a detail view of the inner end of the release lever.

In said drawing, I have shown my improvements employed in connection with a vertical brake staff, the latter being shown in section at 10 and having non-rotatably secured thereto a ratchet wheel A. Said ratchet wheel A, as shown, is provided with a plurality of peripherally disposed ratchet teeth 11, each of which is formed with an undercut face 12 as distinguished from the usual type of operating tooth face which extends radially and which sometimes permits the operating pawl or locking dog to be pressed outwardly when the parts become slightly worn or because of slight variations in manufacture when the shaft is under severe torsion. The staff is suitably journaled in bearings provided therefor in a bracket or supporting casting 13 having a rear wall 14 which is riveted or otherwise rigidly secured to the car wall 15. Oscillatably mounted on the brake staff is a suitable carrier or yoke, part of which is indicated conventionally at 16 and to which is pivotally attached a gravity drop handle 17. The latter may be provided with a socket 18 within which is slidable a spring-pressed pawl 19 having an undercut tooth 20 adapted to cooperate with the ratchet wheel A. As will be understood by those skilled in the art, when the handle 17 is elevated to horizontal position about its pivotal mounting, the pawl is brought into alinement with the ratchet wheel and the latter with the staff may be advanced step by step in a winding direction. When the handle 17 is released, it falls to a depending position, under the influence of gravity, thereby disengaging the pawl from the ratchet wheel.

The bracket 13 is provided also with a horizontal web 21 having upstanding guide flanges 22 and 23 disposed in alinement with the ratchet wheel A and which are adapted to guide the locking dog 24 in its movements back and forth radially toward the ratchet wheel. Said dog 24, on its back or rear side, is formed with a socket 25 within which is seated one end of an expansion spring 26, the opposite end of said spring being seated over a lug 27 preferably formed integral with the back wall 14 of the bracket. At its outer end, the dog 24 is formed with a tooth 28 undercut on its operative face as indicated at 29 but engaging under the ratchet teeth 11. As will be evident, when the ratchet wheel and staff are rotated in a clockwise direction to apply the brake, the teeth of the ratchet wheel will pass by the locking dog 24, the latter yielding step by step and automatically operating to hold the ratchet wheel against rotation in a reverse or unwinding direction.

On account of the teeth of the ratchet wheel being undercut and the tooth of the dog being formed to correspond, it is evident that, to release the dog, considerable force must be applied thereto since, during the release action, the ratchet wheel will necessarily be advanced a slight amount in a winding direction while under tension or torsional strain, due to the undercut dog tooth and ratchet tooth slipping past each other. To facilitate this action, with a minimum of effort for the brakeman, I have provided a release lever designated generally by the reference B. Said lever B has an outwardly extended handle proper 36, the main portion of which preferably extends parallel to the car wall, and is pivoted near its inner end on a bolt 31 suitably mounted in the bearing bracket 13. At the point where the bolt 31 passes through the lever B, the latter is enlarged to provide a suitable hub 32 as shown in Figure 2 and from the hub are extended upper and lower parallel arms 33—33 which straddle the dog 24, as best shown in Figure 2. Each of the arms 33 is recessed or notched so as to provide a relatively long finger 34 and a shorter finger 35 which, in turn straddle or embrace top and bottom vertically extending studs 36—36 formed on the dog 24. With this arrangement, when the handle of the lever B is pulled outwardly or away from the wall of the car, the dog 24 will be retracted against the action of the spring 26 and high leverage ratio provided so as to permit retraction of the dog even though the brake chain is under great tension.

With the arrangement of ratchet teeth and teeth on the dog and pawl, it is evident that neither the dog nor the pawl can be pressed outwardly but on the contrary, the greater the turning force on the ratchet wheel in an unwinding direction, the greater the tendency to interlock the ratchet wheel with the pawl and dog.

I claim:

1. In a hand brake, the combination with a staff having a ratchet wheel rotatable therewith, said ratchet wheel having undercut peripheral teeth, each tooth of said wheel having both faces thereof inclined to a line radial to said wheel and passing through the point of said tooth of means for rotating said staff and ratchet wheel step by step in a winding direction; means for holding said ratchet wheel against accidental rotation in an unwinding direction comprising a spring-influenced slidable dog having also an undercut tooth cooperable with the teeth of the ratchet wheel; and a pivoted release lever having operative engagement with said dog to retract it from the ratchet wheel, said tooth having both faces thereof inclined to the direction of sliding movement of said dog and co-acting respectively with the inclined faces of each tooth of the ratchet wheel.

2. In a hand brake for railway cars, the combination with a bracket adapted to be secured to a wall of the car and a vertical brake staff journaled therein; of a ratchet wheel secured to said staff and having undercut peripheral teeth; means for rotating said ratchet wheel and staff in a winding direction step by step; a spring-influenced locking dog mounted on said bracket and having a tooth provided with an under cut face extending at an angle to the direction of movement of said dog and having flat contact with the corresponding undercut portion of each tooth of said ratchet wheel; guide flanges on said bracket to restrict said dog to a movement bodily radially toward and from the ratchet wheel; and a release lever pivotally mounted on said bracket and having operative engagement with the dog to retract the latter.

3. In a hand brake for railway cars, the combination with a rotatable chain-tightening element having a ratchet wheel rotatable in unison therewith, the ratchet wheel having undercut peripheral teeth, said teeth being undercut relatively to lines radial to said wheel and passing through the points of the respective teeth, means for rotating said element step by step in a winding direction; a spring-influenced slidably mounted dog having an undercut tooth cooperable with the undercut teeth of said ratchet wheel; and a release member operatively engaged with said dog and adapted to retract the latter.

4. In a hand brake for railway cars, the combination with a rotatable brake staff having a ratchet wheel rotatable in unison therewith, the ratchet wheel having peripheral teeth, said teeth being undercut along lines disposed angularly to lines radial to the wheel and passing through the points of the respective teeth; means for rotating said element in a chain winding direction; a locking dog having an undercut tooth cooperable with the undercut teeth of said wheel; and means for moving said dog bodily to retract it from said wheel.

In witness that I claim the foregoing I have hereunto subscribed my name this 14th day of February 1922.

STACY B. HASELTINE.

Witnesses:
UNA C. GRIGSBY,
ANN BAKER.